(12) United States Patent
Chhabra et al.

(10) Patent No.: US 11,283,807 B1
(45) Date of Patent: Mar. 22, 2022

(54) MULTIPLE PANE WEB DISPLAY WITH DYNAMIC CONTENT

(71) Applicant: Indeed, Inc., Austin, TX (US)

(72) Inventors: Vidhem Chhabra, Hyderabad (IN); Abhineet Jain, Hyderabad (IN); Christian Johannessen, Seattle, WA (US); Aditya Pandya, Tokyo (JP); David Park, Tokyo (JP); Luis Tadeo, Seattle, WA (US)

(73) Assignee: Indeed, Inc., Austin, TX (US)

( * ) Notice: Subject to any disclaimer, the term of this patent is extended or adjusted under 35 U.S.C. 154(b) by 0 days.

(21) Appl. No.: 16/711,299

(22) Filed: Dec. 11, 2019

(51) Int. Cl.
| | |
|---|---|
| G06F 15/16 | (2006.01) |
| H04L 29/06 | (2006.01) |
| H04L 67/02 | (2022.01) |
| G06F 16/957 | (2019.01) |
| G06F 16/958 | (2019.01) |

(52) U.S. Cl.
CPC .......... H04L 63/102 (2013.01); G06F 16/957 (2019.01); G06F 16/958 (2019.01); H04L 67/02 (2013.01)

(58) Field of Classification Search
CPC ...... H04L 63/102; H04L 67/02; G06F 16/957
See application file for complete search history.

(56) References Cited

U.S. PATENT DOCUMENTS

| | | | | |
|---|---|---|---|---|
| 8,886,819 B1* | 11/2014 | Shalla | ..................... | G06F 9/545 |
| | | | | 709/229 |
| 2006/0015763 A1* | 1/2006 | Nakajima | ............... | H04L 67/02 |
| | | | | 714/4.1 |
| 2020/0019584 A1* | 1/2020 | Ross | ..................... | G06F 16/972 |

* cited by examiner

*Primary Examiner* — Yves Dalencourt
(74) *Attorney, Agent, or Firm* — Kent B. Chambers; Terrile, Cannatti & Chambers, LLP

(57) ABSTRACT

An inter-frame and webpage generation and communication system and method provide a mechanism by which a parent webpage or frame can allocate a child frame of the displayed page for content generated by a web application other than that generating the parent webpage or frame and certain information can be exchanged between the child frame and the parent webpage or frame. Multiple frames of a webpage not only react to interactive events occurring within that frame, but also react to events occurring in child frames. In at least one embodiment, a mechanism for inter-frame communication is provided to enable communication between child and parent frames, and the inter-frame communication mechanism is agnostic as to whether the code displayed in the child and parent frames is provided by one or more web application servers.

22 Claims, 9 Drawing Sheets

MULTIPLE PANE WEB DISPLAY WITH DYNAMIC CONTENT

BACKGROUND OF THE INVENTION

Field of the Invention

The present invention relates in general to the field of network communications, and more specifically to provision of a frame within a webpage where the frame is provided with data by a different web application server than the web application server associated with the webpage.

Description of the Related Art

Websites provided on the Internet have become a primary mechanism by which owners of the websites interact with the public. A large number of people can view content displayed by webpages received from the website and interact with a webpage via a graphical user interface (GUI), thereby communicating with the website. In addition, a website owner can easily make or authorize changes to a webpage, which keeps the content of the webpage up-to-date.

As one example, websites have become a primary mechanism by which companies post available job opportunities. Job posting websites provide a job description webpage displayable by a client GUI that can include job description details, such as responsibilities, expected experience, and expected education. Job posting websites can also provide a job application webpage enabling a job applicant to respond to a job posting through an interactive online application that allows the job applicant to submit a job application online. In some instances, the job posting website allows the job applicant to submit and store the applicant's resume for multiple applications. Prior to submitting an application for a particular job description, the job applicant may want to reference and edit their stored resume so as to better correlate their experience with the job description. This functionality can be provided by another utility displayed in a webpage.

These operations of displaying a job description, displaying an interactive job application, and editing a resume typically require separate webpages, each generated using data provided by an associated web application server. The application webpage replaces the job description webpage on the screen (e.g., in a new window or a new tab of a web browser program). If the job applicant wants to concurrently display the job application webpage and the job description webpage, the job applicant needs to manually rearrange the webpages to allow concurrent viewing on the screen of the client computer to prevent one webpage from obscuring the other webpage. At the very least, this is an added step that affects the job applicant's user experience in interacting with the job application system. Application and job description webpages that are not designed for concurrent display (e.g., when scaling the webpages for concurrent view hides or makes relevant information illegible), poses another obstacle to the job applicant.

One solution to the issue of multiple webpages being concurrently displayed and manipulated is to provide content from multiple webpages in one webpage display. A first, or parent, webpage provides a region in the displayed webpage where information generated by a second webpage is displayed. An example of a mechanism for providing such space is an inline frame used to embed a second html document within a first html document, where the frame is a child region of the parent webpage. But in order to preserve a viewer's user experience, if errors or other issues occur within the frame region, information displayed by the parent webpage should respond to that error. When the same web application server generates both the parent webpage and child frame information, then the web application server can handle that response. But where different web application servers generate the parent webpage and child frame information, there may be little to no communication between the web application servers to handle such issues.

FIG. 1 is a simplified block diagram illustrating an example of typical generation of webpage displays during a job application process 100. A job posting web server 102, resume web server 103, and editor web server 104 generate respective webpages 110, 130, and 150 that are displayed by a web browser 105 executing on a client computer system. Collectively, webpages 110, 130, and 150 provide information related to a typical online job application search, review, and submission process.

In a typical job application user-website interaction, a user of a client computer submits a search request for types of job positions, including keywords associated with the position, to job posting web server 102. In response, job posting webserver 102 provides a search results window 110 that includes a region of the page displaying the job positions available conforming to the search request (e.g., search results 112). The user can select one of the job positions and the job posting webserver 102 provides a detailed description 114 of that job position. In addition, the webpage can provide a clickable button 116 for the user to indicate that they are interested in applying for the position.

Should the user indicate that they are interested in applying by, for example clicking button 116, search results window 110 is replaced by an application webpage 130 provided by, for example, a resume web server 103, or another tab is opened within the web browser to display the new webpage. Application window 130 can be, for example, a fillable form or can be populated with information previously entered into the website, such as from a resume or the like. The information in webpage 130 can include, for example, applicant name, address, the relevant work experience, education, and the like. If the user wishes to open a resume editor 150, web browser 105 directs the user's request to editor web server 104. Again, a new website window is displayed, obscuring one or both of search results window 110 and application window 130. Blank information fields or updated resume information can be entered into resume editor 150.

FIG. 1 illustrates conventional webpage generation and display during a job application process. Since each of the search results, application, and resume editor windows are separately displayed webpages, in order for a user to view more than one at a time, the user would need to resize browser windows and place them adjacent to each other on the screen. Further, the window objects are generated by different server applications, and may be generated by different server application servers, and therefore may not conveniently exchange information between them. When respective web application servers provide the different webpages 110, 130, and 150, the lack of communication between the window objects can pose another obstacle to a job applicant.

Even a single obstacle to completing an online job application can provide the job applicant a negative experience that may deter the job applicant from utilizing the job application website, and cascading obstacles increase the possibility of such undesired deterrence.

SUMMARY

In one example embodiment, a method is provided for communicating between multiple webpage frames. The method includes: providing, by a first processor, an environment configured to display a webpage on a display coupled to the first processor; displaying a webpage within the environment where content of the webpage is provided by a first application server communicatively coupled to the first processor; displaying a first frame, by the webpage, within the environment where content of the first frame is provided by a second application server communicatively coupled to the first processor and the first frame is a child of the webpage; providing, by the webpage, an event listener configured to receive event information from the first frame; and responding, by the webpage, to the event information from the first frame.

In one aspect of the above example embodiment, the first frame includes dynamic content provided by the second application server. In a further aspect, the event information includes a status associated with the dynamic content. In a still further aspect, the status includes an indication of an error and the responding to the event information includes the webpage closing the frame. In another further aspect, the responding includes the webpage displaying an indication of the status.

In another aspect of the above embodiment, the method further includes: displaying, by the first frame, a second frame within the environment where content of the second frame is provided by a third application server communicatively coupled to the first processor and the second frame is a child of the first frame; providing, by the first frame, a second event listener configured to receive second event information from the second frame; and, responding by the first frame to the second event information from the second frame. In a further aspect, the method further includes modifying content displayed in the second frame and providing the modified content of the second frame to the third application server. The second event information includes an indication of the providing the modified content and responding by the first frame includes accessing the modified content from the second application server. In a still further aspect, the method further includes the second application server accessing the modified content from a database shared with the third application server. In another further aspect, the first application server includes a database having job information, the second application server includes a database including job application information and is communicatively coupled to a database including resume data, and the third application server includes a resume editor program and is communicatively coupled to the database including resume data.

Another example embodiment provides a system for displaying multiple webpage frames. The system includes: a processor; a display coupled to the processor; a network interface, coupled to the processor, and communicatively coupled to a first application server and a second application server; and, a memory, coupled to the processor, storing instructions executable by the processor. The instructions configure the processor to provide an environment configured to display a webpage on the display, display a webpage within the environment where the content of the webpages provided by the first application server, display a first frame by the webpage within the environment where content of the first frame is provided by the second application server and the first frame is a child of the webpage, provide by the webpage an event listener configured to receive event information from the first frame, and respond by the webpage to the event information from the first frame.

In one aspect of the above embodiment, the first frame includes dynamic content provided by the second application server. In a further aspect, the event information includes a status associated with the dynamic content. In still a further aspect, the status includes an indication of an error and the instructions configured to respond to the event information include further instructions to close the frame. In another further aspect, the instructions configured to respond to the event information include further instructions to display an indication of the status in the webpage.

In another aspect of the above embodiment, the system further includes instructions to configure the processor to: display, by the first frame, a second frame within the environment where the network interface is further coupled to a third application server, content of the second frame is provided by the third application server, and the second frame is a child of the first frame; provide, by the first frame, a second event listener configured to receive second event information from the second frame; and, respond, by the first frame, to the second event information from the second frame. In a further aspect, the system includes further instructions to configure the processor to: modify content displayed in the second frame; and, provide the modified content of the second frame to the third application server. The second event information includes an indication of the providing the modified content and responding by the first frame includes accessing the modified content from the second application server.

BRIEF DESCRIPTION OF THE DRAWINGS

Embodiments of at least an inter-frame and webpage generation and communication system and method may be better understood, and its numerous objects, features and advantages made apparent to those skilled in the art by referencing the accompanying drawings. The use of the same reference number throughout the several figures designates a like or similar element.

The use of the same reference symbols in different drawings indicates identical items unless otherwise noted. The figures are not necessarily drawn to scale.

DETAILED DESCRIPTION

Embodiments of an inter-frame and webpage generation and communication system and method provide a mechanism by which a parent webpage or frame can allocate a child frame of the displayed page for content generated by a web application other than that generating the parent webpage or frame and certain information can be exchanged between the child frame and the parent webpage or frame. In at least one embodiment multiple frames of a webpage display not only react to interactive events occurring within that frame, but also react to events occurring in child frames. In at least one embodiment, a mechanism for inter-frame communication is provided to enable communication between child and parent frames, and the inter-frame communication mechanism is agnostic as to whether the code displayed in the child and parent frames is provided by one or more web application servers. In at least one embodiment, information exchanged between frames can include, for example, status information to which the parent frame can respond or indications that a displayed button has been clicked.

Web-based interaction between a web application server and a user of a client-side web browser can involve using several web applications in sequence or in parallel. Typically, for actions that are performed in parallel, or when information from one application is desirable in another application, the user opens multiple browser windows at the same time and resizes those windows so that, if there is sufficient display space, all windows can be viewed simultaneously. If information displayed in one browser window is desirable in another web application browser window, the user manually transfers the information from one of the windows to another, and then the user saves the transferred information. Then the user may need to perform other tasks that require opening and resizing yet another window, incurring additional inconvenience, time, and possibility for error (e.g., inadvertent closing of a window) to include the additional window with the others being displayed. Embodiments of the present system and method improve a user's experience by, for example, utilizing technology to open frames populated with data generated by multiple web application servers, and facilitating inter-frame communication that, in at least some embodiments, avoids opening and resizing of multiple windows and allows frames to communication certain information with one another to allow the frames to respond to events occurring within one another. While examples provided herein are related to job applications, it should be noted that embodiments of the systems and method herein are not limited to particular content, such as job applications or other human resources functions.

Figure 2:
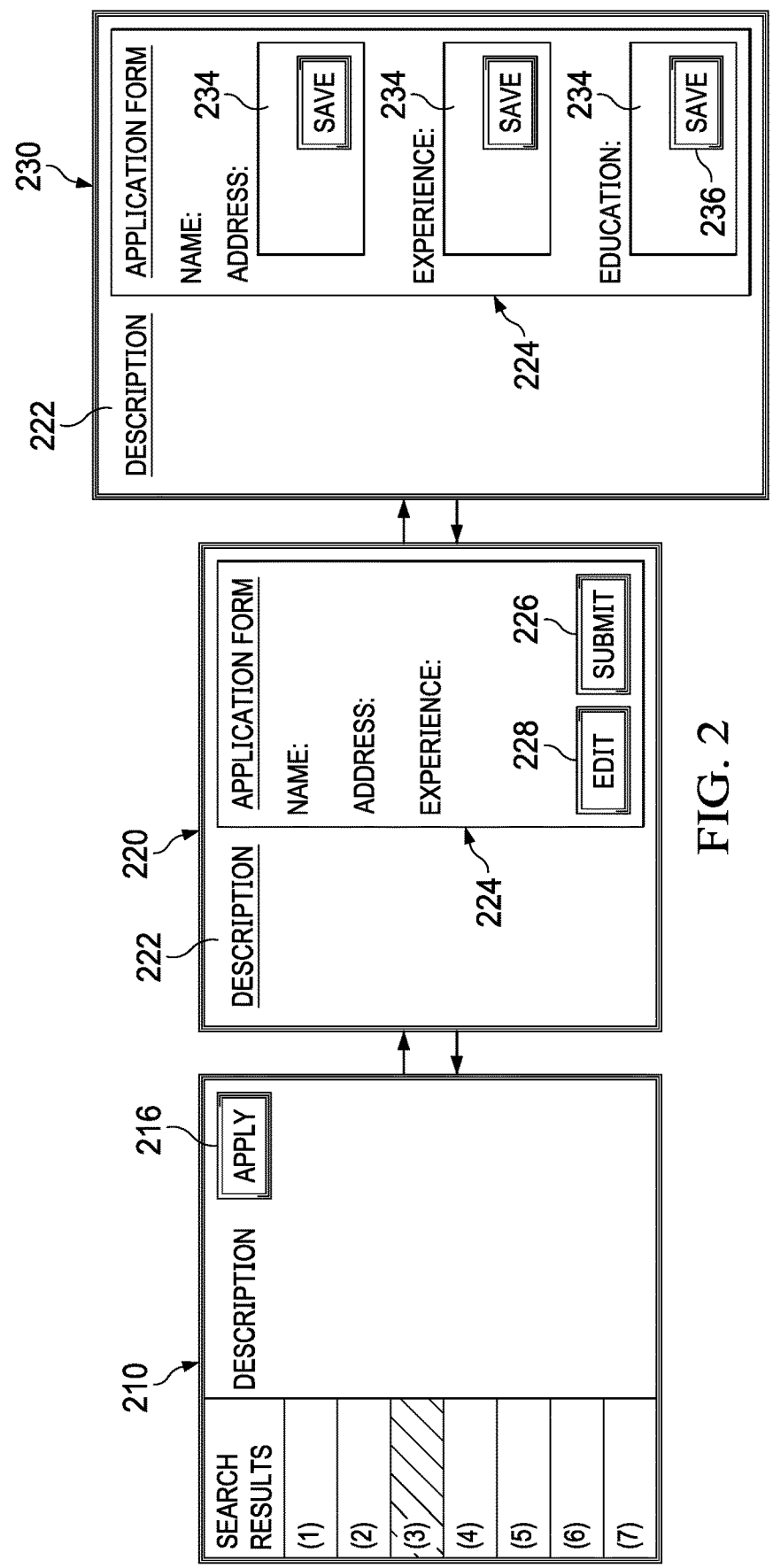
FIG. 2 is a simplified block diagram illustrating an example of an improved web application windowing environment.

FIG. 2 is a simplified block diagram illustrating an example of an improved web application windowing environment providing a webpage displaying content generated by multiple web application servers through the use of in-line frames. The frames and the webpage are configured to communicate certain status information so that, for example, a parent webpage can react to status information communicated by a frame that is a child of the webpage.

Figure 1:
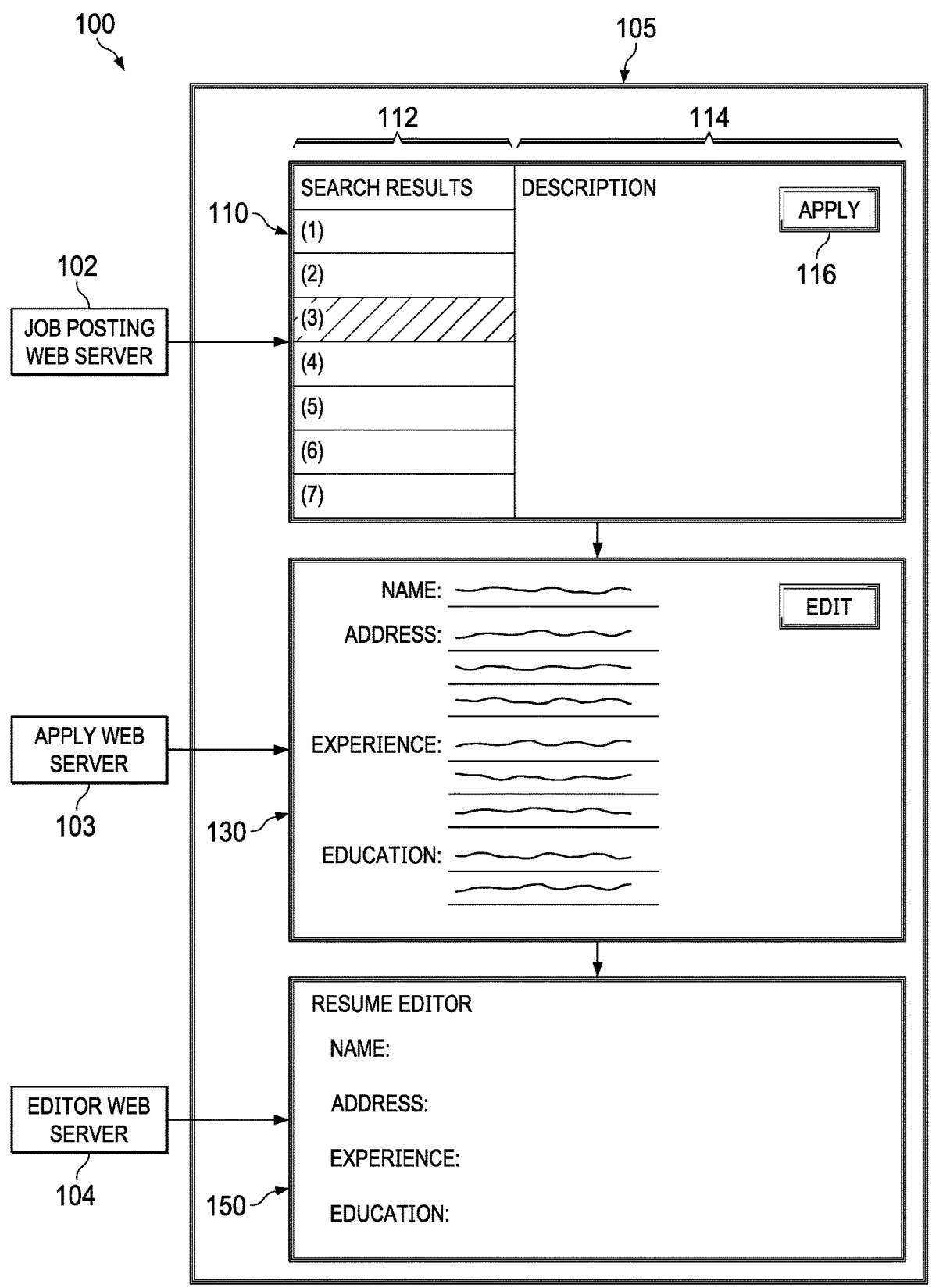
FIG. 1 (prior art) is a simplified block diagram illustrating an example of typical webpage displays.
Figure 3:
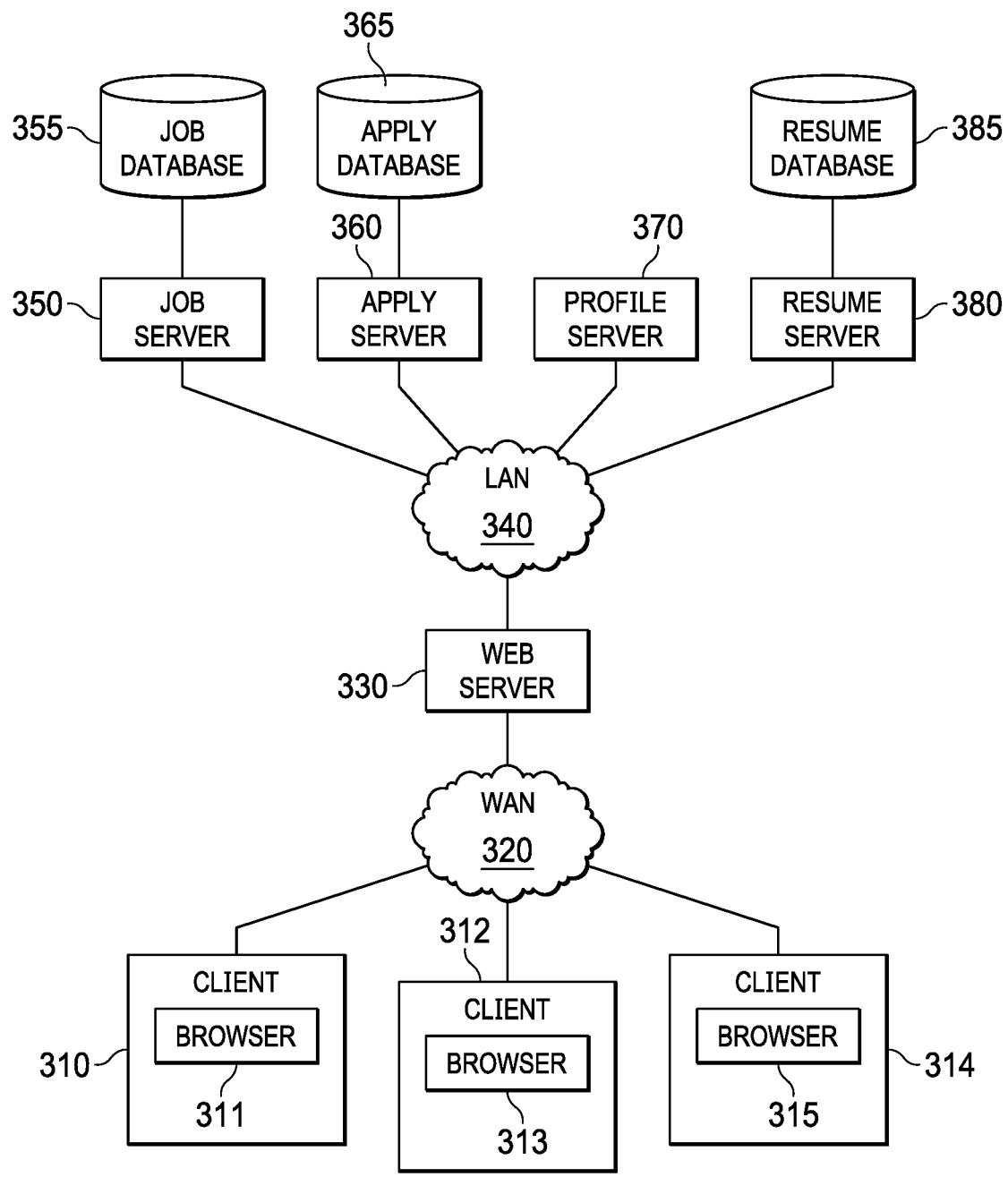
FIG. 3 is a simplified block diagram illustrating an example of a web services environment.

Using the same example discussed in conjunction with FIG. 1, a user performs a search for job positions and a job server (e.g., job server 350 in FIG. 3) generates a job search results webpage 210 for display by a web browser of a client computer system (e.g., client 310, 312, or 314 in FIG. 3). A user can click on an application button 216 to apply for a displayed job position. In response, a web browser (e.g., browser 311, 313, or 315 in FIG. 3) can display the information regarding the job description in a first portion 222 of webpage 220. In addition, an application server (e.g., apply server 360 in FIG. 3) generates an application form displayed in a second portion 224 within webpage 220. In this manner, the user experience provides access to the information displayed in both portions of the webpage at the same time. In at least one embodiment, second portion 224 can be generated by webpage 220 using an inline frame, where webpage 220 is a parent of the child frame 224.

An apply server can pre-populate the application form displayed in second portion 224 using resume information already stored by a user in the website provider's databases. Should the resume information provided in the application form displayed in second portion 224 be sufficient to complete the job application form, the user can click a "submit" button 226 displayed within second portion 224. Clicking the "submit" button causes the apply server to submit the information illustrated in the application form for the job described in first portion 222 of webpage 220. Submission of the information in the application form involves communication of the displayed information in the application form to an appropriate web application server or database (e.g., job server 350 or a job server operated by a company submitting the job). Further, the child frame can provide information regarding the click of the "submit" button 226 directly to the parent webpage (e.g., webpage 220). The parent webpage can provide an event listener and event handler (not shown) to respond to the click of "submit" button 226. In response to receiving the click event information, the parent webpage can, for example close the child frame, or refresh webpage content from a web application server.

If the user decides that the information provided in the application form, displayed in second portion 224 of webpage 220, should be modified for the job application, the user selects an "edit" button 228 displayed in second portion 224. Subsequently, webpage 230 continues to display the information regarding the job description in first portion 222 and displays portions of the application form in second portion 224 (e.g., entry identifiers and the like). In addition, another web application server (e.g., profile server 370) generates a resume editor application for display and interaction with the user in one or more third portions 234 of webpage 230. Similar to webpage 220, the user has access to the information displayed in all portions of webpage 230 at the same time, thereby allowing the user to make reference to information in the job description section while editing a resume provided by the resume editor in third portions 234.

Once the user has made desired changes to the resume displayed by the resume editor, the user saves those changes by clicking a "save" button 236 displayed in third portion 234. In response to this action, the job server and apply servers, for example, once again provide information for display of webpage 220, where an application form can be displayed with information updated from the resume editor session. Communication occurs between a web application server providing the resume editor session (e.g., profile server 370) and a server storing the resume information (e.g., resume server 380), such that any updated resume information is stored by the server storing the resume information. In addition, the web application server providing the application form (e.g., apply server 360) updates displayed information. Further, the applicant can decide whether to submit the form for the job position (e.g., by clicking "submit" button 226). The user's clicking the "submit" button, in turn, causes the web application server displaying the application form (e.g., apply server 360) to provide the information displayed in the application form of second portion 224 to an appropriate server for the displayed job (e.g., job server 350), and also can inform the web application server displaying the job search that the position has been applied for.

In addition to the communication of data between the web application servers, the child frames (e.g., second portion 224 and third portion 234) can communicate information to the parent frames or website directly, as needed. Such information can include status information regarding the webpage information being displayed within the frame. For example, if a network node sourcing the portion of the webpage (e.g., apply server 360 or profile server 370) is unreachable or cannot display the desired information, then the child frame can inform the parent frame/webpage that the web-based information is unavailable and the parent can perform tasks in response to that status (e.g., close the frame and inform the user). Similarly, if a button is clicked in a child frame, notification of that click is provided to the parent and the parent frame or webpage can be refreshed or updated in response. The parent and child can perform this communication through, for example, an event listener and an event handler, as will be discussed more fully below.

Figure 11:
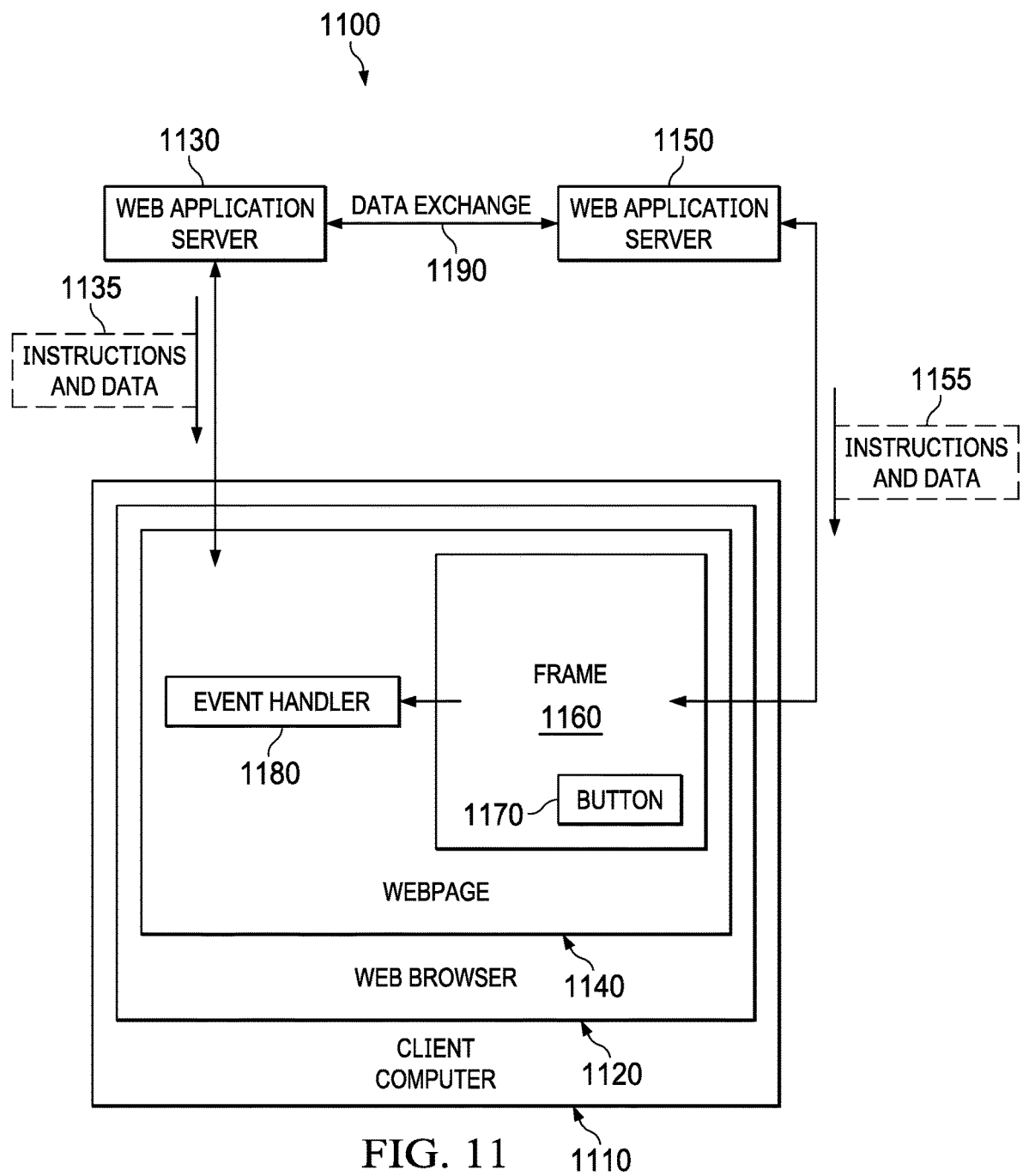
FIG. 11 is a simplified block diagram illustrating an example of a web application windowing environment providing communication between a parent webpage and a child frame.

FIG. 11 is a simplified block diagram illustrating an example of a web application windowing environment 1100 providing communication between a parent webpage and a child frame. A client computer 1110 executes a web browser application 1120 to display web pages that are provided by web application servers 1130 and 1150. Web application server 1130 provides one or more files containing information (e.g., instructions and data 1135) that web browser 1120 displays as a webpage 1140. Instructions and data 1135 include instructions for generating a child frame 1160 in a region of webpage 1140. Once frame 1160 is generated, web browser 1120 executes additional instructions from webpage 1140 to communicate with web application server 1150, which provides another set of instructions and data 1155 that display as an application and content in frame 1160.

Part of the content displayed in frame 1160 includes a button 1170. Button 1170 can be clicked by a user of client computer 1110. Instructions and data 1155 include instructions for responding to a click of button 1170, which can include a response by the application displayed in frame 1160 and a response by web application server 1150. In addition, instructions and data 1155 can include instructions for the application displayed in frame 1160 to provide information to an event handler 1180 executed by webpage 1140. Webpage 1140 has instructions to respond to events and communicate to event handler 1180. In this manner, webpage 1140 can respond to events communicated by the application displayed in frame 1160 without a need for the same web application server providing the information and data for both webpage 1140 and frame 1160. A click of button 1170 is one type of event information that can be communicated by frame 1160. Other types of status events can be provided to event handler 1180, including, for example, failure or success to communicate with web application server 1150, HTML errors, and the like. In addition to the event information passed from frame 1160 to event handler 1180, web application servers 1130 and 1150 can exchange data and other information 1190 between them through network communication links or direct data links, as indicated by the application.

FIG. 3 is a simplified block diagram illustrating an example of a web services environment. Client network nodes 310, 312, and 314 are communicatively coupled to a wide area network 320. Also, communicatively coupled to wide area network 320 is a webserver 330. Webserver 330 is configured to provide a conduit to web content that can be provided to network nodes 310, 312, and 314, as needed. In turn, network nodes 310, 312, and 314 are configured to display the web content as webpages for a user to view and interact with, through, for example, a web browser capable of displaying HTML content.

Continuing the example presented in FIGS. 1 and 2, webserver 330 is in turn coupled to a set of web application servers (e.g., job server 350, apply server 360, profile server 370, and resume server 380 via a local area network 340). The web application servers provide information specific to their various tasks. For example, job server 350 provides information associated with a job database 355. The job server can provide the search functionality discussed above and can provide information related to those entries in the database that match search criteria specified by a user for display (e.g., matching certain experience keywords). Resume server 380 provides information associated with a resume database 385 to the other application servers as needed (e.g., apply server 360 for applications or profile server 270 for editing). The resume displayed will generally be a resume previously stored by a session user, and the information related to who that user is can be provided by information stored by a web browser (e.g., cookies). Similarly, apply server 360 can provide the webpage information related to application forms which can be stored in apply database 365. In addition, the application database can include stored completed application forms associated with a job profile accessed by a session user. Profile server 370 can provide the web applications used for generation and functioning of a resume editor.

It should be appreciated from FIG. 3 that the various portions of a displayed webpage can be provided by different web application servers and that those web application servers need not be administered by the same group within an entity or by the same entity.

Figure 4:
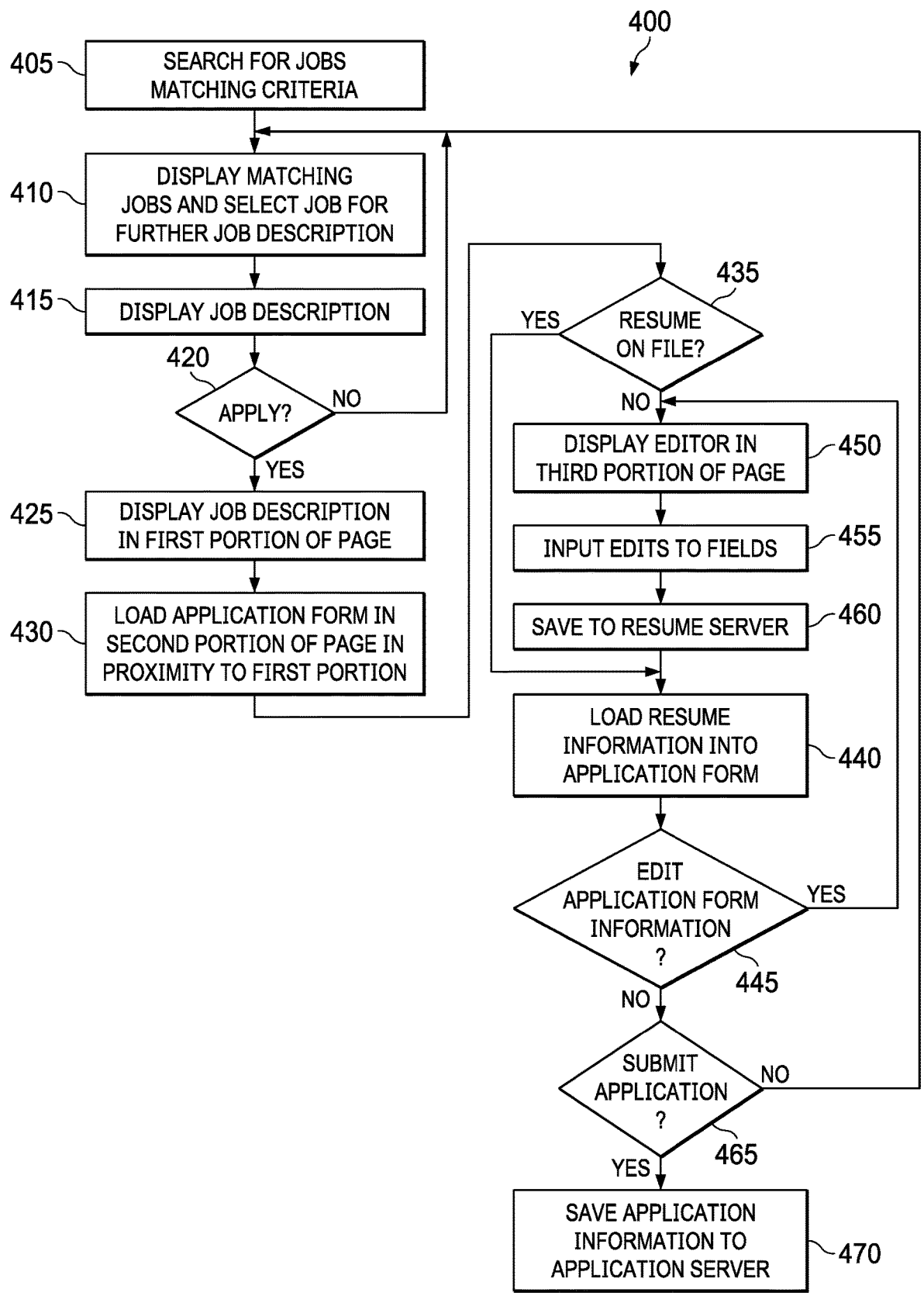
FIG. 4 is a simplified flow diagram illustrating an example of a high-level process flow.

FIG. 4 is a simplified flow diagram illustrating an example of a high-level process flow 400 for a job application system. As described in the examples above, for a job search application, a user can access a web-based system and perform a search for job positions matching certain criteria (405). With reference to FIG. 3, job server 350 can perform the search on information stored in job database 355. In response to the search, the webpage can display jobs matching the search criteria and provide an opportunity for the user to select a job for further job description (410). Upon selecting a desired search entry, the webpage can display the detailed job description (415). As above, the information related to the job description can be accessed by job server 350 from job database 355.

The webpage can then give the user an opportunity to decide whether to apply for the displayed job (420). If the user chooses not to apply for the displayed job, then the webpage can redisplay the jobs matching the search criteria (410) and offer an opportunity to select a different job. If the user chooses to apply for the displayed job, then the webpage can display the detailed job description in a first portion of the webpage (425). In addition, the webpage can load an application form in a second portion of the webpage in proximity to the displayed first portion (430). This step will be discussed in greater detail below. In some embodiments, the second portion of the webpage can be an inline frame displayed within the webpage.

In order to pre-populate the application form, a determination can be made as to whether a resume associated with the user is already on file (435). This determination can be made, for example, by resume server 380 performing a search on resume database 385. If a resume is on file, then information from the resume can be loaded into the displayed application form (440). Now that the job description information and the information from the user's resume are displayed on the screen at the same time, the user can decide whether to edit the application form information (445). A user may want to do this, for example, to more closely match the user's experience disk encryption with the desired qualifications displayed in the job description. If the user does not wish to edit the application form information, the user can be given an option to submit the information from the application form as a job application (465).

If the user wishes to edit the information in the application form, then a resume editor can be displayed in a third portion of the webpage (450). This step will be discussed in greater detail below. It should be noted that if the resume was not on file at step 435, an opportunity can be given to enter the resume editor at that point to provide information related to the user for the job. As another alternative, rather than providing a third portion of the webpage, the application form display can be replaced on the screen by the resume editor in the second portion of the webpage. Within the resume editor, the user can input any edits to the various fields provided by the resume editor (455). Once those edits are provided, the user can save the edits to the resume server (460). The updated resume information can then be loaded into the application form (440), and the user can decide whether further editing is desired (445) or to submit the information as an application (465). If the user decides to submit the application, then the application information can be saved to the application server (470). If the user opts to not submit an application, then the process can return to displaying the jobs matching the search criteria (410).

Figure 5:
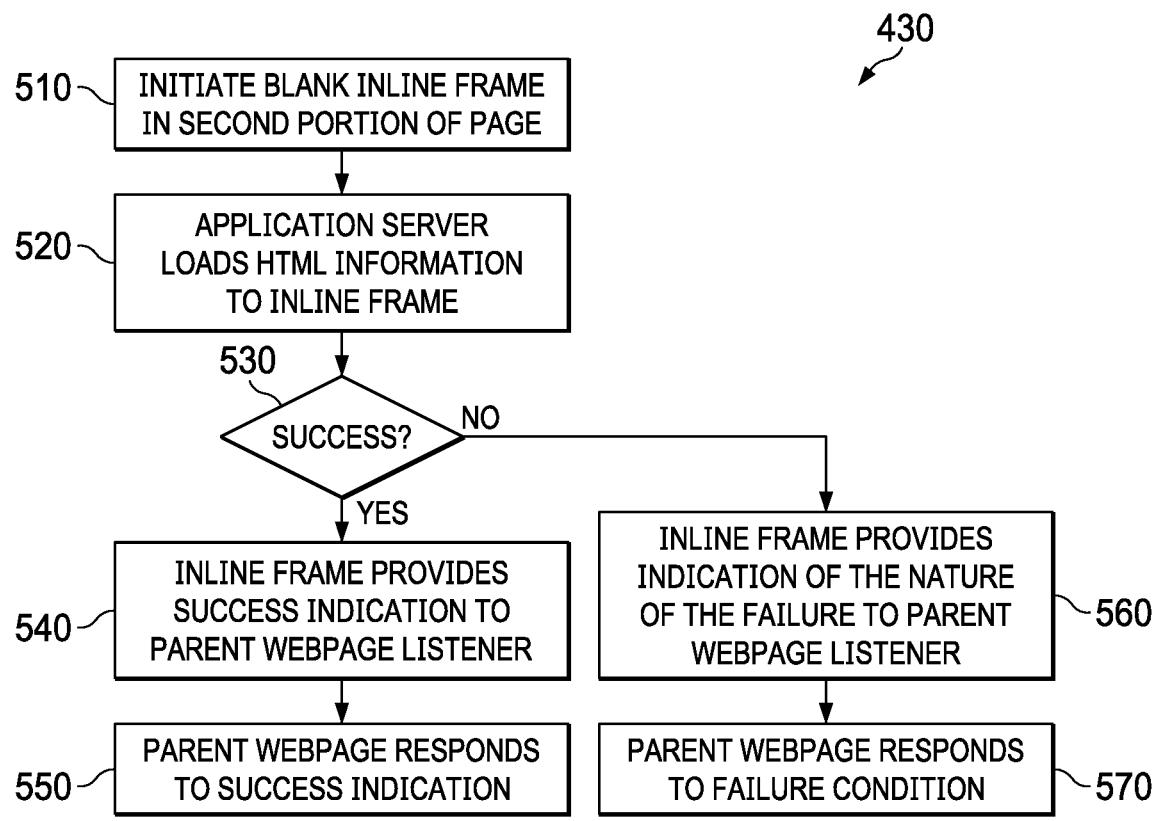
FIG. 5 is a simplified flow diagram detailing an example process flow for loading an application form as provided in step 430 of FIG. 4.

FIG. 5 is a simplified flow diagram detailing an example process flow for loading an application form as provided in step 430 of FIG. 4. The steps in FIG. 5 assume the use of inline frames for the portions of the webpage discussed in FIG. 4, above. In order to load the application form (430), the parent webpage initiates a blank inline frame in a second portion of the page (510). Subsequent to initiating the frame, a web application server (e.g., apply server 360) can load HTML information to the inline frame for display (520). If the loading of information is successful (530), then the inline frame can provide a success indication to an event listener provided by the parent webpage (540). The parent webpage can then respond to the success indication in a manner appropriate to the application (550). For example, at that point, the parent webpage can allow interaction with the displayed inline framed information, including listening for any button click indication to which the parent webpage may be configured to respond.

If the loading of the HTML information into the inline frame is not successful (530), then the inline frame can provide an indication of the nature of the failure to the parent webpage listener (560). The parent webpage can then respond in an appropriate manner to the failure condition (570). For example, in order to improve the user experience, the parent webpage can gracefully close the inline frame and indicate to the user that the process or the apply server is not available at that time.

Figure 6:
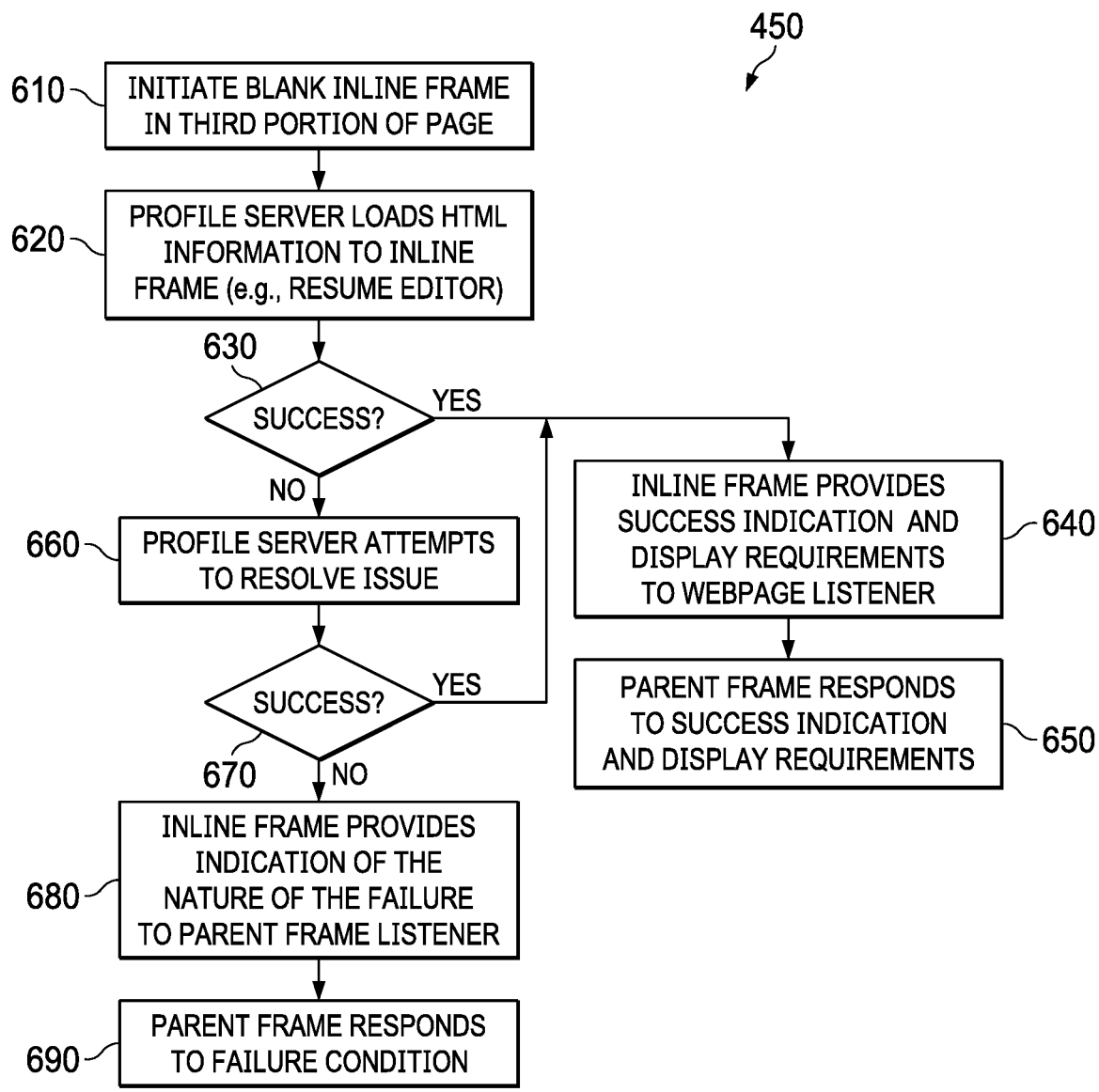
FIG. 6 is a simplified flow diagram detailing an example process flow for loading a resume editor, or other similar user interactive process, as provided in step 450 of FIG. 4.

FIG. 6 is a simplified flow diagram detailing an example process flow for loading a resume editor, or other similar user interactive process, as provided in step 450 of FIG. 4. As with FIG. 5, the steps in FIG. 6 assume the use of in-line frames. In order to load the resume editor, a parent frame initiates a blank in-line frame in third portion of the webpage (610). Subsequent to initiating the frame, a web application server (e.g., profile server 370) can load HTML information to the in-line frame for display (620). In the example provided in FIG. 4, the HTML information will be related to a resume editor to change information related to a job applicant's experience, education, and the like. If the loading of the HTML information is successful (630), then the in-line frame can provide a success indication and can also provide, for example, display requirements to an event listener provided by the parent frame (640). Display requirements can include, for example, a desired vertical space allocated to the in-line frame for the resume editor within the parent frame. In this manner, a user can be provided an appropriate space to perform editing functions for particular entry topic. The parent frame can respond to the success indication and the provided display requirements, if any, in an appropriate manner (650). As with FIG. 5, the parent frame can allow interaction with the displayed in-line framed information and listen for any further information provided by the in-line frame.

If the loading of the HTML information into the in-line frame is not successful (660), the web application server can attempt to resolve the issue in order to provide the information in the in-line frame (660). If the web application server is successful in resolving the error (670), the process can continue at step 640, discussed above. If the web application server is unsuccessful in resolving the error (670), then the in-line frame can provide an indication of the nature of the failure to an event listener provided by the parent frame (680). The parent frame can then respond to the failure condition in an appropriate manner (690). As with the example discussed above, such actions can include gracefully closing the in-line frame in the third portion of the webpage, informing the user of the nature of the error, and the like.

Figure 7:
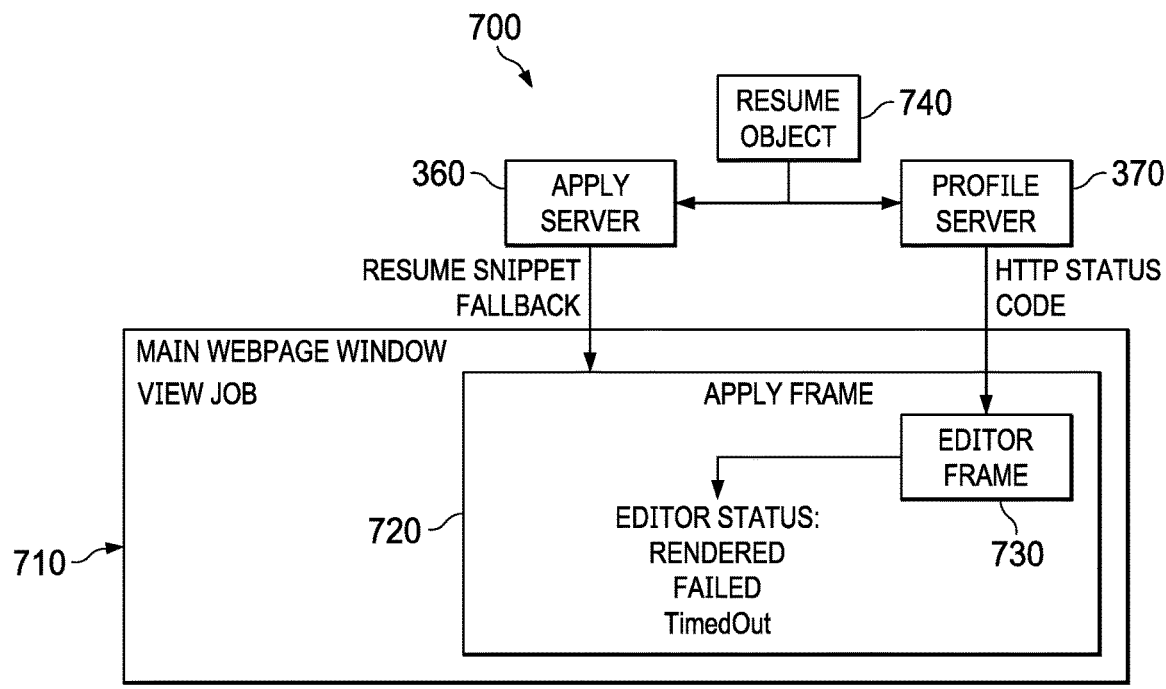
FIG. 7 is a simplified block diagram illustrating an example of data flow between a parent frame and a child frame, and associated web application servers.

FIG. 7 is a simplified block diagram illustrating an example of data flow 700 between a parent frame and a child frame, and associated web application servers. A main webpage window 710 is illustrated having an apply frame 720 as a child, and an editor frame 730 is provided as a child to the apply frame. HTML information associated with apply frame 720 is provided by apply server 360, while HTML information associated with editor frame 730 is provided by profile server 370. As discussed in the examples above, the apply frame and the editor frame share information associated with a user's resume, which is provided as resume object 740. For example, apply server 360 can provide information associated with resume object 740 to apply frame 720 for display purposes, including snippets of resume information, full resume information, and information associated with how to recover from issues with editor frame 730. Profile server 370 can provide HTML code associated with the resume editor, and status information associated with the display. Editor frame 730 can provide status information to a listener process executing within apply frame 720. As illustrated, such status information can include whether the resume editor has been successfully rendered, failed to render, or otherwise timed out. Apply frame 720 can have status handling processes associated with each of these provided statuses.

Figure 8:
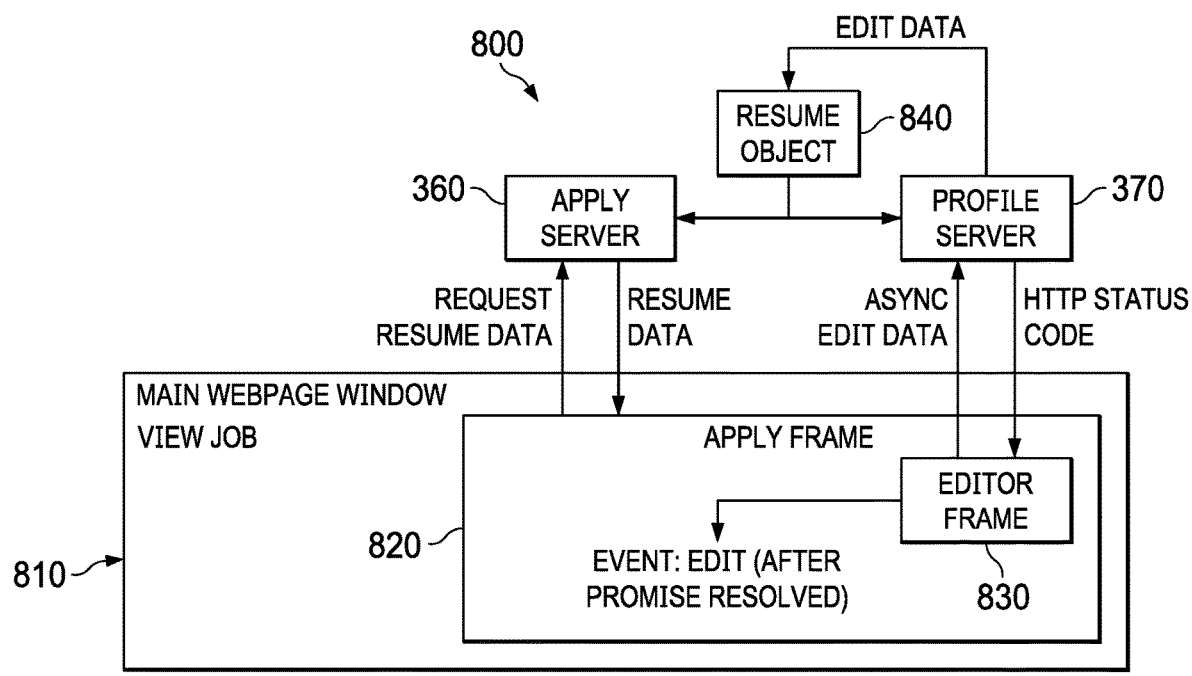
FIG. 8 is a simplified block diagram illustrating an example of data flow between a parent frame and a child frame, and associated web application servers, during a data refresh from the child frame to its associated server.

FIG. 8 is a simplified block diagram illustrating an example of data flow 800 between a parent frame and a child frame, and associated web application servers, during a data refresh from the child frame to its associated server. A main webpage window 810 is illustrated having an apply frame 820 as a child, and an editor frame 830 provided as a child to the apply frame. As with FIG. 7, HTML information associated with apply frame 820 is provided by apply server 360, while HTML information associated with editor frame 830 is provided by profile server 370. The apply frame and the editor frame share information associated with a user's resume, which is provided as resume object 840.

A purpose of the resume editor is to allow the user to update information stored within resume object 840. A user can provide updated or new information using an interface provided in editor frame 830. Once the information is provided, the user can indicate the information is complete by clicking a button provided in the interface (e.g., save button 236), which then asynchronously provides the edited data to profile server 370. The profile server can then provide the information to a server supporting resume object 840 for updating. Once the update is complete, the profile server provides a success status indication to the editor frame, which can then indicate success and also provide an edit status indication to apply frame 820 as the parent. The apply frame can then respond to the successful edit status by requesting the updated information from apply server 360, which can access the information from resume object 840. The updated resume data can then be displayed in the appropriate areas of apply frame 820. In addition, the editor frame can be closed, if desired. Similarly, unsuccessful edit statuses can be provided by editor frame 830 to apply frame 820, as the parent, for response appropriate to the user experience application.

The example flow of FIGS. 4-8 illustrate the nature of simultaneous display of information in a webpage from a variety of sources, the ability to modify the displayed information, and communication of that information between the various web application servers responsible for the information displayed. Information other than user submitted data can be exchanged between the portions of the webpage. For example, status information can be shared such that if one portion (or frame) of the webpage were to have an error, another portion of the page could provide information to the user regarding the error or otherwise respond. It should also be noted that a parent frame can provide information to an event listener process executed by a child frame of that parent frame, if desired for the application.

Figure 9:
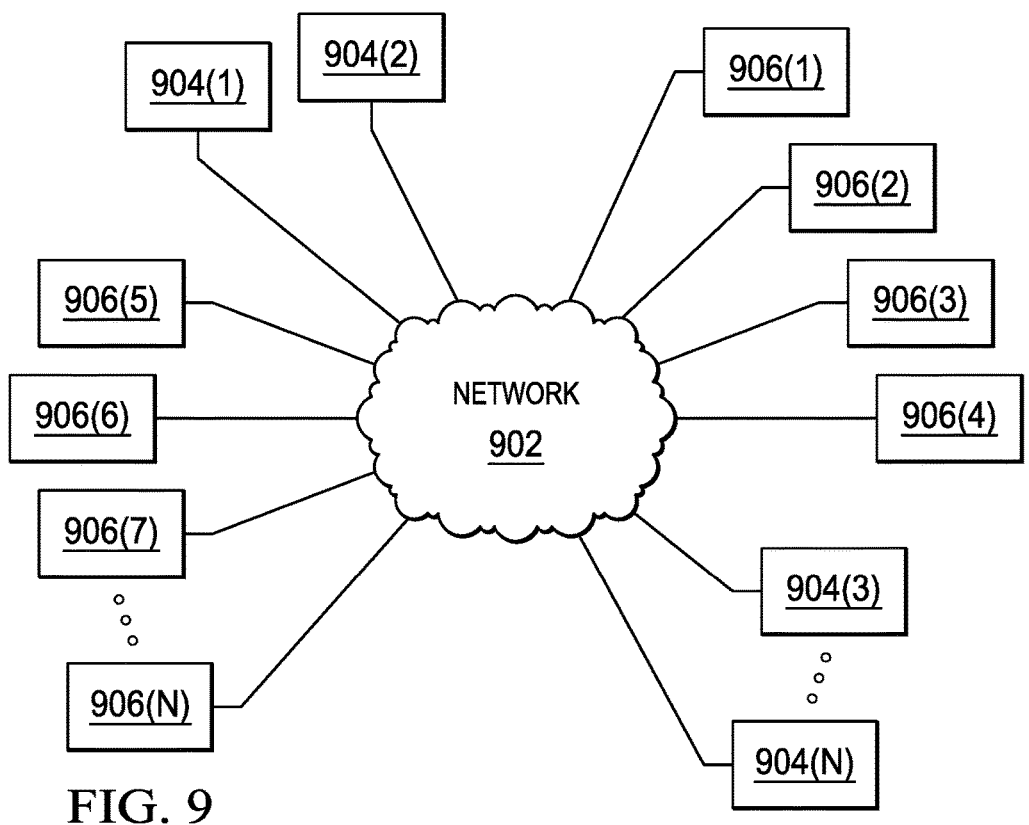
FIG. 9 is a simplified block diagram illustrating a network environment.

FIG. 9 is a simplified block diagram illustrating a network environment in which embodiments of an inter-frame and webpage generation and communication system and method can be practiced. Network 902 (e.g. a private wide area network (WAN) or the Internet) includes a number of networked server computer systems 904(1)-(N) that are accessible by client computer systems 906(1)-(N), where N is the number of server computer systems connected to the network. Communication between client computer systems 906(1)-(N) and server computer systems 904(1)-(N) typically occurs over a network, such as a public switched telephone network over asynchronous digital subscriber line (ADSL) telephone lines or high-bandwidth trunks, for example communications channels providing T1 or OC3 service. Client computer systems 906(1)-(N) typically access server computer systems 904(1)-(N) through a service provider, such as an internet service provider ("ISP") by executing application specific software, commonly referred to as a browser, on one of client computer systems 906(1)-(N).

Client computer systems 906(1)-(N) and/or server computer systems 904(1)-(N) may be, for example, computer systems of any appropriate design, including a mainframe, a mini-computer, a personal computer system including notebook computers, a wireless, mobile computing device (including personal digital assistants, smart phones, and tablet computers). When programmed to implement at least one embodiment of the present invention, the computer systems are specialized machines. These computer systems are typically information handling systems, which are designed to provide computing power to one or more users, either locally or remotely. Such a computer system may also include one or a plurality of input/output ("I/O") devices coupled to the system processor to perform specialized functions. Tangible, non-transitory memories (also referred to as "storage devices") such as hard disks, compact disk ("CD") drives, digital versatile disk ("DVD") drives, and magneto-optical drives may also be provided, either as an integrated or peripheral device. In at least one embodiment, the multi-frame display of the present invention can be implemented using code stored in a tangible, non-transient computer readable medium and executed by one or more processors. In at least one embodiment, aspects of the present invention can be implemented completely in hardware using, for example, logic circuits and other circuits including field programmable gate arrays.

Figure 10:
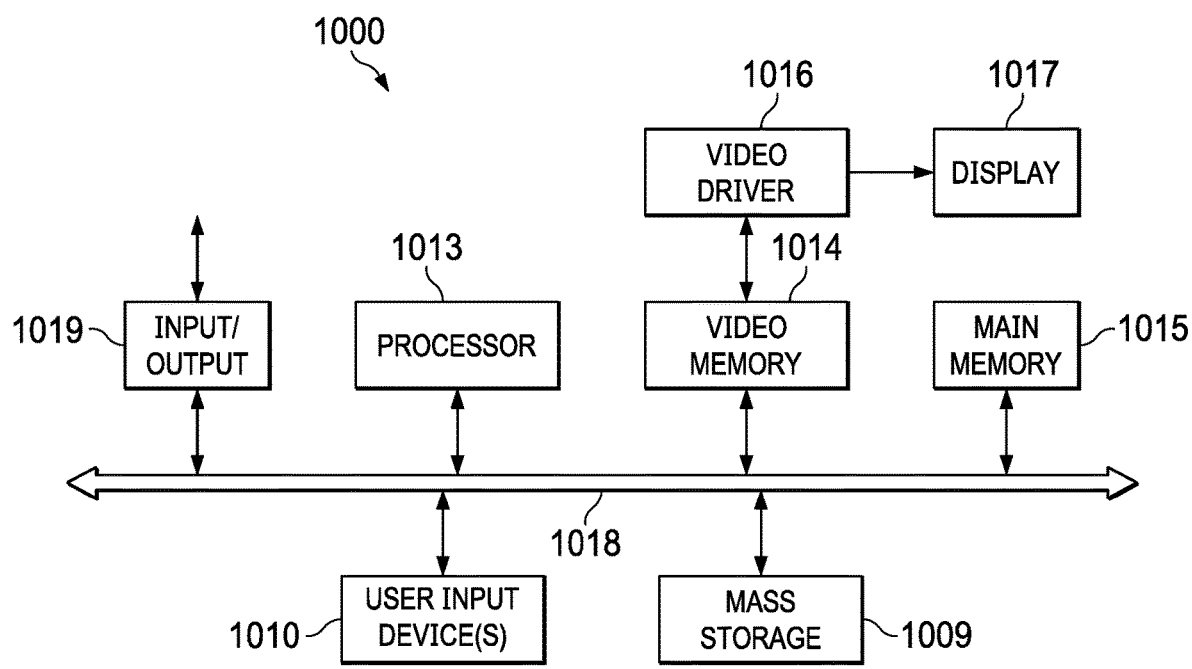
FIG. 10 is a simplified block diagram illustrating an example computer system.

Embodiments of the multi-frame display and communication system and method can be implemented as a specialized configuration of computer 1000 illustrated in FIG. 10. Computer 1000 can be a dedicated computer system or a virtual, emulated system located in, for example, a cloud computing environment. Input user device(s) 1010, such as a keyboard and/or mouse, are coupled to a bi-directional system bus 1018. The input user device(s) 1010 are for introducing user input to the computer system and communicating that user input to processor 1013. The computer system of FIG. 10 generally also includes a non-transitory video memory 1014, non-transitory main memory 1015, and non-transitory mass storage 1009, all coupled to bi-directional system bus 1018 along with input user device(s) 1010 and processor 1013. Mass storage 1009 may include both fixed and removable media, such as, for example, a hard drive, one or more CDs or DVDs, solid state memory including flash memory, and other available mass storage technology. Bus 1018 may contain, for example, 32 of 64 address lines for addressing video memory 1014 or main memory 1015. System bus 1018 can also include, for example, an n-bit data bus for transferring data between and among the components, such as CPU 1009, main memory 1015, video memory 1014 and mass storage 1009, where "n" is, for example, 32 or 64. Alternatively, multiplex data/address lines may be used instead of separate data and address lines.

I/O device(s) 1019 can provide connections to peripheral devices, such as a printer, and can also provide a connection to remote computer systems via a telephone link or to the Internet via an ISP. I/O device(s) 1019 may also include a network interface device to provide a connection to a remote computer systems via a network link to the Internet via a POP (point of presence). Such connection may be made using, for example, wireless techniques, including digital cellular telephone connection, Cellular Digital Packet Data (CDPD) connection, digital satellite data connection or the like. Examples of I/O devices include modems, sound and video devices, and specialized communication devices such as the aforementioned network interface.

Computer programs and data are generally stored as instructions and data in a non-transient computer readable medium such as a flash memory, optical memory, magnetic memory, compact disks, digital versatile disks, and any other type of memory. The computer program is loaded from a memory, such as mass storage 1009, into main memory 1015 for execution. Computer programs may also be in the form of electronic signals modulated in accordance with the computer program and data communication technology when transferred via a network. Webpages are, in at least one embodiment, created using hypertext markup language or other language compatible with one or more types of web browsers. In at least one embodiment, Java applets or any other technology is used with webpages to allow a user of a web browser to make and submit selections and allow a client computer system to capture the user selection and submit the selection data to a server computer system.

The processor 1013, in one embodiment, can be a suitable single core or multi-core microprocessor or microcomputer. Main memory 1015 is comprised of dynamic random-access memory (DRAM). Video memory 1014 is a dual-ported video random access memory. One port of the video memory 1014 is coupled to video driver 1016. Video driver 1016 is used to drive the display 1017. Video driver 1016 is well known in the art and may be implemented by any suitable means. In one example, this circuitry can convert pixel data stored in video memory 1014 to a raster signal suitable for use by display 1017. Display 1017 is a type of monitor suitable for displaying graphic images.

The computer system described above is for purposes of example only. The multi-frame display system of embodiments of the present invention can be implemented in any type of appropriate computer system or programming or processing environment. It is contemplated that the multi-frame display system can run on a stand-alone computer system coupled to a network providing the described servers, such as the one described above. Aspects of the multi-frame display system can be executed from a server computer systems system accessible by a plurality of client computer systems interconnected over a network.

Although embodiments have been described in detail, it should be understood that various changes, substitutions, and alterations can be made hereto without departing from the spirit and scope of the invention as defined by the appended claims.

What is claimed is:

1. A method for communicating between multiple webpage frames, the method comprising:
   providing, by a first processor, an environment configured to display a webpage on a display coupled to the first processor;
   displaying a webpage within the environment wherein content of the webpage is provided by a first application server communicatively coupled to the first processor;
   displaying a first frame, by the webpage, within the environment, wherein:
   content of the first frame is provided by a second application server; and
   the first frame is a child of the webpage;
   providing, by the webpage, an event listener configured to receive event information from the first frame; and
   responding, by the webpage, to the event information from the first frame;
   displaying, by the first frame, a second frame within the environment, wherein content of the second frame is provided by a third application server communicatively coupled to the first processor, and the second frame is a child of the first frame;
   providing, by the first frame, a second event listener configured to receive second event information from the second frame; and
   responding, by the first frame, to the second event information from the second frame.

2. The method of claim 1 wherein the first frame comprises dynamic content provided by the second application server.

3. The method of claim 2 wherein the event information comprises a status associated with the dynamic content.

4. The method of claim 3, wherein:
   the status comprises an indication of an error, and
   said responding to the event information comprises the webpage closing the frame.

5. The method of claim 3 wherein said responding comprises the webpage displaying an indication of the status.

6. The method of claim 1 further comprising:
   modifying content displayed in the second frame; and
   providing the modified content of the second frame to the third application server, wherein:
   the second event information comprises an indication of said providing the modified content: and
   said responding by the first frame comprises accessing the modified content from the second application server.

7. The method of claim 6 further comprising the second application server accessing the modified content from a database shared with the third application server.

8. The method of claim 1, wherein:
   the first application server comprises a database comprising job information;
   the second application server comprises a database comprising job application information and is communicatively coupled to a database comprising resume data: and
   the third application server comprises a resume editor program and is communicatively coupled to the database comprising resume data.

9. A system for displaying multiple webpage frames, the system comprising:
   one or more processors;
   a display coupled to the one or more processors;
   a network interface, coupled to the processor, and communicatively coupled to a first application server and a second application server; and
   a memory, coupled to the processor, and storing instructions executable by the processor, the instructions configure the processor to:
   provide an environment configured to display a webpage on the display,
   display a webpage within the environment wherein the content of the webpage is provided by the first application server;
   display a first frame, by the webpage, within the environment wherein content of the first frame is provided by the second application server and the first frame is a child of the webpage;
   provide, by the webpage, an event listener configured to receive event information from the first frame;
   respond, by the webpage, to the event information from the first frame;

display, by the first frame, a second frame within the environment, wherein the network interface is further coupled to a third application server; content of the second frame is provided by the third application server; and the second frame is a child of the first frame;

provide, by the first frame, a second event listener configured to receive second event information from the second frame; and respond, by the first frame, to the second event information from the second frame.

10. The system of claim 9 wherein the first frame comprises dynamic content provided by the second application server.

11. The system of claim 10 wherein the event information comprises a status associated with the dynamic content.

12. The system of claim 11, wherein:
the status comprises an indication of an error; and
the instructions configured to respond to the event information comprise further instructions to close the frame.

13. The system of claim 11 wherein the instructions configured to respond to the event information comprise further instructions to display an indication of the status in the webpage.

14. The system of claim 9 comprising further instructions to configure the processor to:
modify content displayed in the second frame; and
provide the modified content of the second frame to the third application server, wherein:
the second event information comprises an indication of said providing the modified content: and
said responding by the first frame comprises accessing the modified content from the second application server.

15. The system of claim 9, wherein:
the first application server comprises a database comprising job information;
the second application server comprises a database comprising job application information and is communicatively coupled to a database comprising resume data: and
the third application server comprises a resume editor program and is communicatively coupled to the database comprising resume data.

16. A non-transitory, computer readable medium comprising instructions stored therein and executable by one or more processors of a computer system to:
provide an environment configured to display a webpage on a display;
display a webpage within the environment wherein the content of the webpage is provided by a first application server;
display a first frame, by the webpage, within the environment wherein content of the first frame is provided by a second application server and the first frame is a child of the webpage, wherein a network interface, coupled to the one or more processors, communicatively couples the one or more processors to the first application server and the second application server;
provide, by the webpage, an event listener configured to receive event information from the first frame;
respond, by the webpage, to the event information from the first frame;
display, by the first frame, a second frame within the environment, wherein the network interface is further coupled to a third application server; content of the second frame is provided by the third application server; and the second frame is a child of the first frame;
provide, by the first frame, a second event listener configured to receive second event information from the second frame; and
respond, by the first frame, to the second event information from the second frame.

17. The non-transitory, computer readable medium of claim 16 wherein the first frame comprises dynamic content provided by the second application server.

18. The non-transitory, computer readable medium of claim 17 wherein the event information comprises a status associated with the dynamic content.

19. The non-transitory, computer readable medium of claim 18, wherein:
the status comprises an indication of an error; and
the instructions configured to respond to the event information comprise further instructions to close the frame.

20. The non-transitory, computer readable medium of claim 18 wherein the instructions configured to respond to the event information comprise further instructions to display an indication of the status in the webpage.

21. The non-transitory, computer readable medium of claim 16 comprising further instructions executable by the processor to:
modify content displayed in the second frame; and
provide the modified content of the second frame to the third application server, wherein:
the second event information comprises an indication of said providing the modified content: and
said responding by the first frame comprises accessing the modified content from the second application server.

22. The non-transitory, computer readable medium of claim 16, wherein:
the first application server comprises a database comprising job information;
the second application server comprises a database comprising job application information and is communicatively coupled to a database comprising resume data: and
the third application server comprises a resume editor program and is communicatively coupled to the database comprising resume data.

* * * * *